United States Patent
Takanashi et al.

(10) Patent No.: US 10,762,830 B2
(45) Date of Patent: Sep. 1, 2020

(54) DISPLAY APPARATUS, METHOD, AND STORAGE MEDIUM

(71) Applicant: CANON KABUSHIKI KAISHA, Tokyo (JP)

(72) Inventors: Ikuo Takanashi, Utsunomiya (JP); Tatsuya Kimoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/038,756

(22) Filed: Jul. 18, 2018

(65) Prior Publication Data

US 2019/0035325 A1 Jan. 31, 2019

(30) Foreign Application Priority Data

Jul. 26, 2017 (JP) .................................. 2017-144398

(51) Int. Cl.
*G09G 3/22* (2006.01)
*G03B 21/14* (2006.01)
*H04N 9/31* (2006.01)
*G03B 21/20* (2006.01)

(52) U.S. Cl.
CPC .............. *G09G 3/22* (2013.01); *G03B 21/147* (2013.01); *G03B 21/2053* (2013.01); *H04N 9/3155* (2013.01); *H04N 9/3182* (2013.01); *G09G 2310/08* (2013.01); *G09G 2320/0242* (2013.01); *G09G 2320/0626* (2013.01)

(58) Field of Classification Search
CPC .............. G09G 3/22; G09G 2320/0626; G09G 2320/0242; G09G 2310/08; H04N 9/3182; H04N 9/3155; G03B 21/2053; G03B 21/147
See application file for complete search history.

(56) References Cited

U.S. PATENT DOCUMENTS

| | | | | |
|---|---|---|---|---|
| 2010/0295879 A1* | 11/2010 | Tanaka | ................ | G09G 3/3426 345/690 |
| 2013/0257918 A1* | 10/2013 | Tada | .................... | G09G 3/3406 345/690 |
| 2015/0301272 A1* | 10/2015 | Chang | ..................... | G02B 6/00 349/58 |
| 2016/0210912 A1* | 7/2016 | Tada | .................... | G09G 3/3426 |
| 2017/0154586 A1* | 6/2017 | Morimoto | ................ | G09G 3/36 |

FOREIGN PATENT DOCUMENTS

| | | |
|---|---|---|
| JP | 2006-133750 A | 5/2006 |
| JP | 2008-046572 A | 2/2008 |
| JP | 2009-058786 A | 3/2009 |
| JP | 2014-187460 A | 10/2014 |

* cited by examiner

*Primary Examiner* — Premal R Patel
(74) *Attorney, Agent, or Firm* — Canon U.S.A., Inc. IP Division (57) ABSTRACT

A display apparatus includes a light source, a light amount control unit configured to control an amount of light emitted from the light source, an image processing unit configured to control a signal level of the image signal, and a control unit configured to control the light amount control unit and the image processing unit based on the image signal. The control unit performs control such that, when the image signal changes, the signal level of the image signal controlled by the image processing unit becomes a signal level corresponding to the changed image signal more quickly than the light amount controlled by the light amount control unit reaches a light amount corresponding to the changed image signal.

9 Claims, 11 Drawing Sheets

DISPLAY APPARATUS, METHOD, AND STORAGE MEDIUM

BACKGROUND

Field of the Disclosure

The present disclosure generally relates to image processing and, more particularly, to a display apparatus, method and storage medium.

Description of the Related Art

There are conventionally known techniques for adjusting the light amount of an image projection apparatus according to input image data to improve the contrast of a display image.

For example, Japanese Patent Application Laid-Open No. 2014-187460 discusses a technique for controlling a light-shielding member for shielding light emitted from a light source according to input image data to adjust the light amount and correct the signal level of the input image data.

Japanese Patent Application Laid-Open No. 2006-133750 discusses a technique for performing control when the signal level of input image data changes from a dark level to a bright level, to increase a response speed of a diaphragm for adjusting the light amount emitted from a light source.

The technique discussed in Japanese Patent Application Laid-Open No. 2014-187460 determines the correction amount of a signal level according to the position of the light-shielding member. When a target scene changes from a dark scene to a bright scene, this technique performs correction to increase the signal level of the bright signal level while the light-shielding member is controlling the light amount. This is a problem in that the signal level of image data is saturated and overexposure of display image occurs, resulting in degraded display quality.

The technique discussed in Japanese Patent Application Laid-Open No. 2006-133750 drives and controls a diaphragm as a light-shielding member by using a motor, making it difficult to improve the response speed. Therefore, when the target scene changes from a dark scene to a bright scene, this technique performs correction to increase the signal level for the bright scene during the response period of the diaphragm. This is a problem in that the signal level is saturated and overexposure of display image occurs, resulting in degraded display quality.

SUMMARY

The present disclosure provides improvements in image processing technology in view of the above-described circumstances, and generally relates to an image processing apparatus achieving improvements in display quality in controlling the light amount according to the signal level of image data.

According to one or more aspects of the present disclosure, a display apparatus for displaying an image based on an image signal includes a light source, a light amount control unit configured to control an amount of light emitted from the light source, an image processing unit configured to control a signal level of the image signal, and a control unit configured to control the light amount control unit and the image processing unit based on the image signal. The control unit performs control such that, when the image signal changes, the signal level of the image signal controlled by the image processing unit becomes a signal level corresponding to the changed image signal more quickly than the light amount controlled by the light amount control unit reaches a light amount corresponding to the changed image signal.

Further features of the present disclosure will become apparent from the following description of exemplary embodiments with reference to the attached drawings.

DESCRIPTION OF THE EMBODIMENTS

Figure 1:
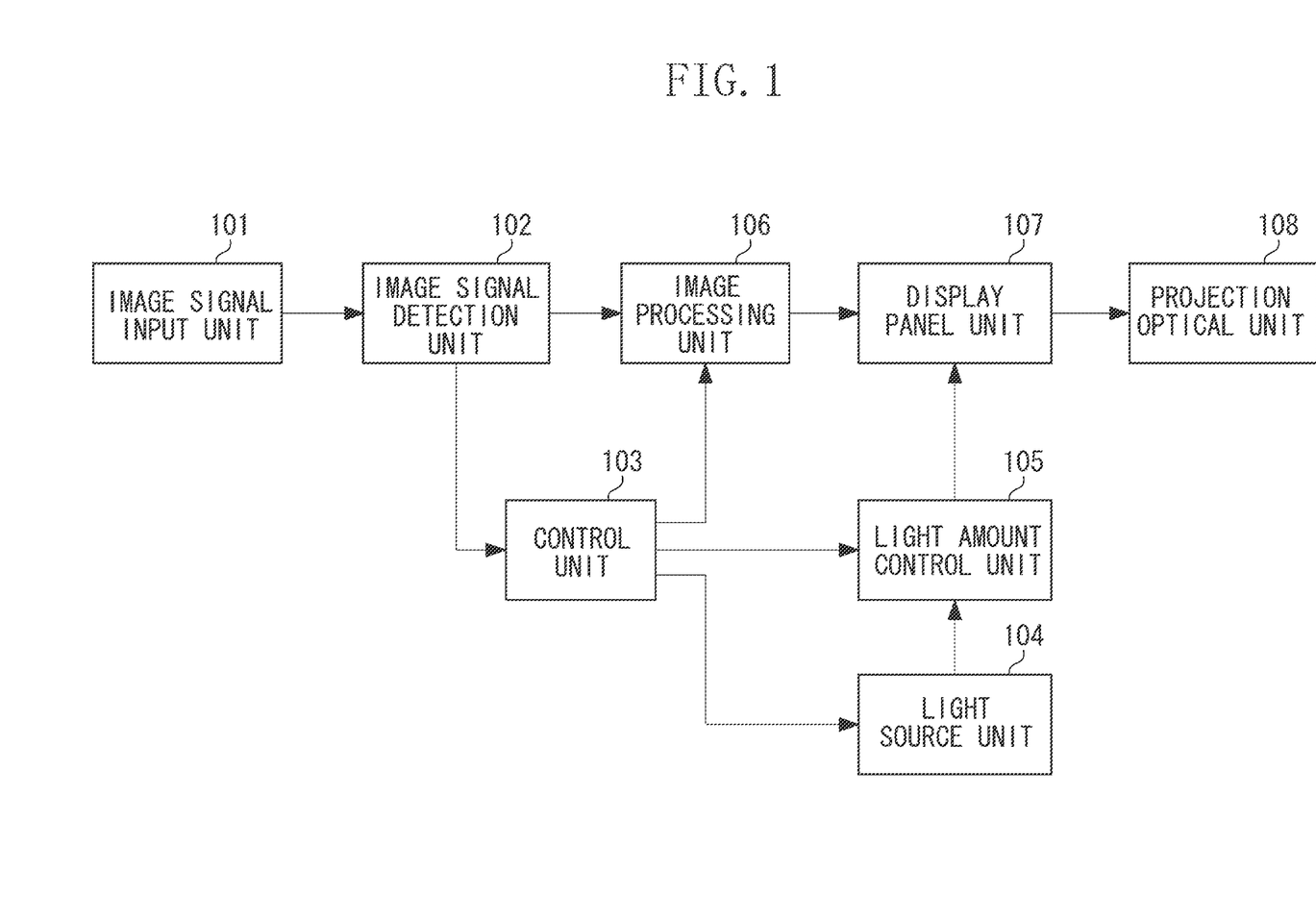
FIG. 1 is a block diagram illustrating an example of an image projection apparatus.

Various exemplary embodiments, features, and aspects of the present disclosure will be described in detail below with reference to the accompanying drawings. FIG. 1 illustrates an overall configuration of an image projection apparatus (display apparatus) according to a first exemplary embodiment of the present disclosure.

The image projection apparatus includes an image signal input unit 101, an image signal detection unit 102, a control unit 103, a light source unit 104, a light amount control unit 105, an image processing unit 106, a display panel unit 107, and a projection optical unit 108.

The image signal input unit 101 is a terminal for inputting an image signal such as high-definition multimedia interface (HDMI, registered trademark), digital visual interface (DVI), and DisplayPort. The image signal input unit 101 is connected with an external image signal output apparatus such as a personal computer and video player. The image signal input unit 101 receives, as an input image signal, an image signal output by an image signal output apparatus and outputs the received input image signal to the image signal detection unit 102.

The image signal detection unit 102 derives image information of the input image signal output by the image signal input unit 101. As image information, for example, the image signal detection unit 102 derives an average picture level (APL) value for each frame of the input image signal. The APL value is the average value of the signal level of the input image signal. A bright input image signal has a high signal level, which results in a large APL value. On the other hand, a dark input image signal has a low signal level, which results in a small APL value. The image signal detection unit 102 outputs the input image signal to the image processing unit 106 and at the same time outputs the derived APL value to the control unit 103.

While the image signal detection unit 102 according to the present exemplary embodiment derives the APL value of the input image signal as image information, the image signal detection unit 102 may derive a histogram representing the distribution of the signal level of the input image signal. When a histogram is derived, the image signal detection unit 102 outputs a median or a mode value to the control unit 103 as image information. The present exemplary embodiment will be described below centering on a case where the APL value is used as image information.

Figure 2:
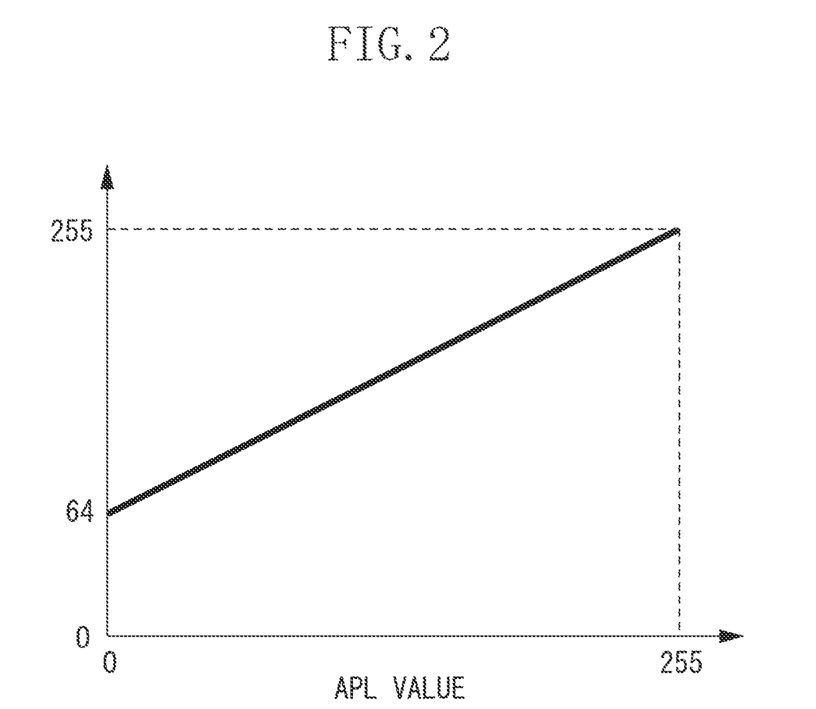
FIG. 2 schematically illustrates a relation between an average picture level (APL) value and a light amount control value.

The control unit 103 determines the light amount control value for adjusting the light amount of the light emitted from the light source unit 104 (described below) based on the APL value detected by the image signal detection unit 102. FIG. 2 schematically illustrates a relation between the APL value detected by the image signal detection unit 102 and the light amount control value. The horizontal axis represents the APL value and the vertical axis represents the light amount control value. Referring to FIG. 2, when the APL value is small, i.e., in the case where a signal level of the input image signal is low and indicates a dark image, the light amount control value takes a small value. When the APL value is large, i.e., in the case where the signal level of the input image signal is high and indicates a bright image, the light amount control value takes a large value. The light amount control unit 103 outputs the determined light amount control value to the light amount control unit 105 and the image processing unit 106.

The light source unit 104 is a lamp (such as a high-pressure mercury lamp, halogen lamp, and metal halide lamp) or a solid light source such as a light emitting diode (LED) and a semiconductor laser.

The light amount control unit 105 adjusts the light amount of the light emitted from the light source unit 104 based on the light amount control value output by the control unit 103. The light amount control unit 105 includes optical members (light-shielding members) such as a diaphragm and shutter, and a drive unit such as a motor. The light amount control unit 105 drives the motor based on the light amount control value to change the aperture diameter or open/close state of the optical members to adjust a light-shielding amount of the light output by the light source unit 104, thus performing light amount control.

Figure 3:
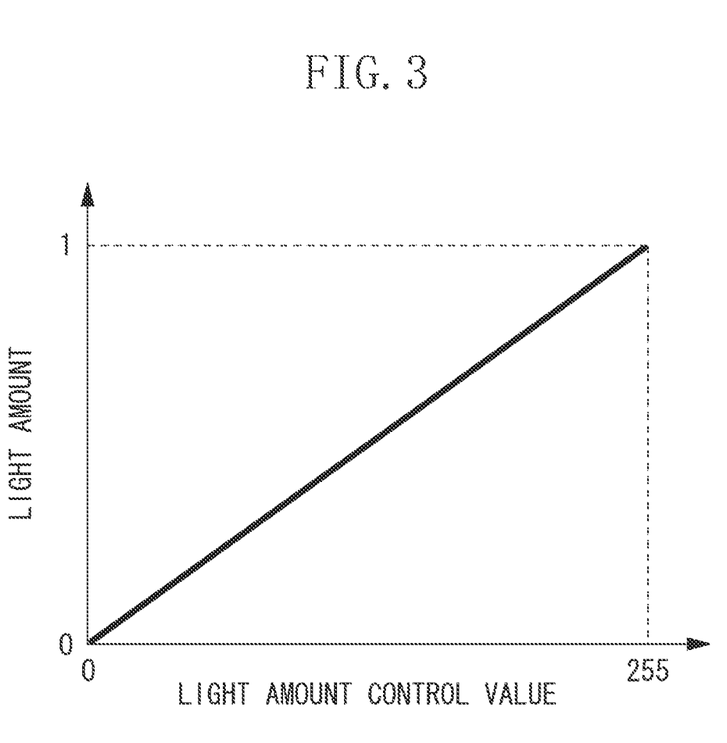
FIG. 3 schematically illustrates a relation between the light amount control value and an output light amount.

The light having undergone light amount control by the light amount control unit 105 illuminates the display panel unit 107. FIG. 3 schematically illustrates a relation between the light amount control value and the light amount controlled by the light amount control unit 105. The horizontal axis represents the light amount control value, and the vertical axis represents the light amount (an amount output from the light amount control unit 105) controlled by the light amount control unit 105. A light amount 1 indicates a state where the light amount for illuminating the display panel unit 107 is not shielded by the optical members (the maximum light amount for illumination is provided). However, since the optical members are driven by the drive unit such as a motor, it takes time until the controlled light amount reaches a target light amount. FIG. 3 illustrates a relation between the light amount control value and the light amount in a state where the controlled light amount reaches the target light amount (stationary state).

Referring to FIG. 3, when the light amount control value is large, the light amount control unit 105 controls the optical members to decrease the light-shielding amount to increase the light amount to be output from the light amount control unit 105. On the other hand, when the light amount control value is small, the light amount control unit 105 controls the optical members to increase the light-shielding amount to decrease the light amount to be output from the light amount control unit 105. While, according to the present exemplary embodiment, the light amount control unit 105 controls the light amount emitted from the light source unit 104, the light amount control unit 105 may be located on the optical path between the display panel unit 107 and the projection optical unit 108 or inside the projection optical unit 108. If the light source unit 104 is capable of adjusting the output light amount, the light amount control unit 105 may be omitted. In this case, the control unit 103 may output the light amount control value to the light source unit 104 to adjust the outgoing light amount of the light source unit 104, thus performing light amount control. Even in this case, it takes time until the controlled light amount reaches the target light amount although the time is shorter than the time in the case of the above-described optical members.

The control unit 103, which may include one or more processors and one or more memories, may determine the correction amount to be used when the image processing unit 106 corrects (controls) the image signal. While the present exemplary embodiment will be described below on the premise that the correction amount is the gain value, the correction amount may be a quantity for enabling correction of the signal level of the input image signal (brightness of the image), such as the gamma correction amount.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 4:
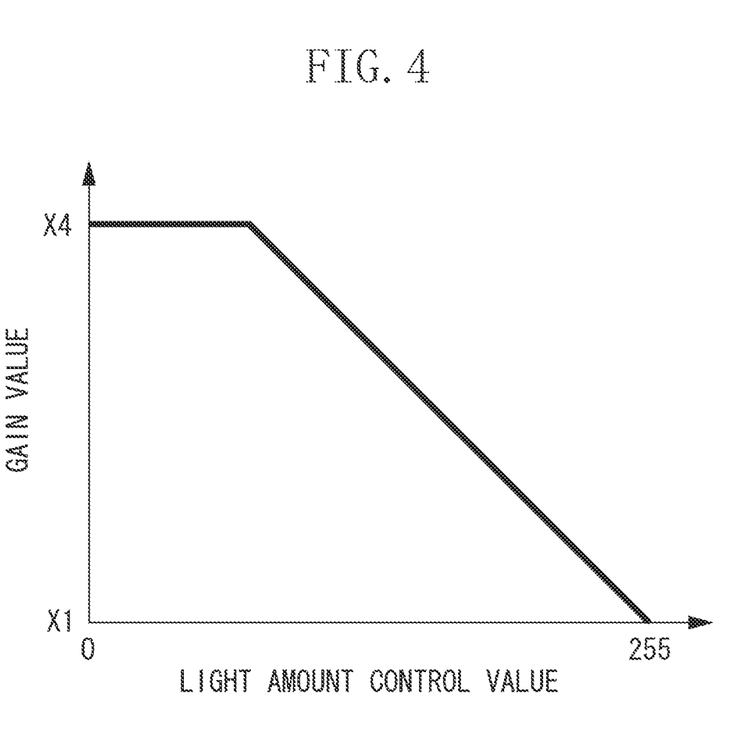
FIG. 4 schematically illustrates a relation between the light amount control value and a gain value.

FIG. 4 schematically illustrates a relation between the light amount control value output by the control unit 103 and the gain value. The horizontal axis represents the light amount control value, and the vertical axis represents the gain value. When the light amount control value is small, the light amount control unit 105 controls the light amount to decrease it, and therefore the light amount for illuminating the display panel unit 107 decreases. Therefore, referring to FIG. 4, when the light amount control value is small, the control unit 103 increases the gain value as the correction amount of the image signal level to compensate decrease in the brightness of the display image due to the reduction in the light amount for illuminating the display panel unit 107. On the other hand, when the light amount control value is large, a large light amount illuminates the display panel unit 107 and therefore the control unit 103 decreases the gain value. The control unit 103 outputs the gain value as the correction amount to the image processing unit 106.

The image processing unit 106 performs desired image processing such as resolution conversion, color adjustment, and level correction on the image signal. In level correction, the image processing unit 106 corrects the image signal level by multiplying the image signal by the gain value determined by the control unit 103. The image processing unit 106 outputs the processed output image signal to the display panel unit 107.

The display panel unit 107 separates the light output from the light amount control unit 105 into three colors (red (R), green (G), and blue (B) colors), modulates each separated light based on the output image signal by using optical modulation devices for respective colors, combines the modulated light, and outputs the combined light to the projection optical unit 108. Examples of optical modulation devices include a liquid crystal panel and a digital mirror device (DMD) having a number of pixels.

The projection optical unit 108 including a projection optical system such as a projection lens projects the light modulated by the display panel unit 107 on a screen and performs focus control and zoom control.

In the above-described configuration according to the present exemplary embodiment, when the image signal is wholly dark, the image signal detection unit 102 detects a small APL value, and the control unit 103 outputs a small light amount control value. Therefore, the light amount control unit 105 decreases the light amount. As a result, dark regions of the display image are more darkly represented. By increasing the gain value, a possibility that bright regions of a wholly dark display image become dark, can be reduced.

On the other hand, when the image signal is wholly bright, the image signal detection unit 102 detects a large APL value, and the control unit 103 outputs a large light amount control value. Therefore, the light amount control unit 105 increases the light amount. As a result, bright regions of the display image are brightly represented.

Figure 5:
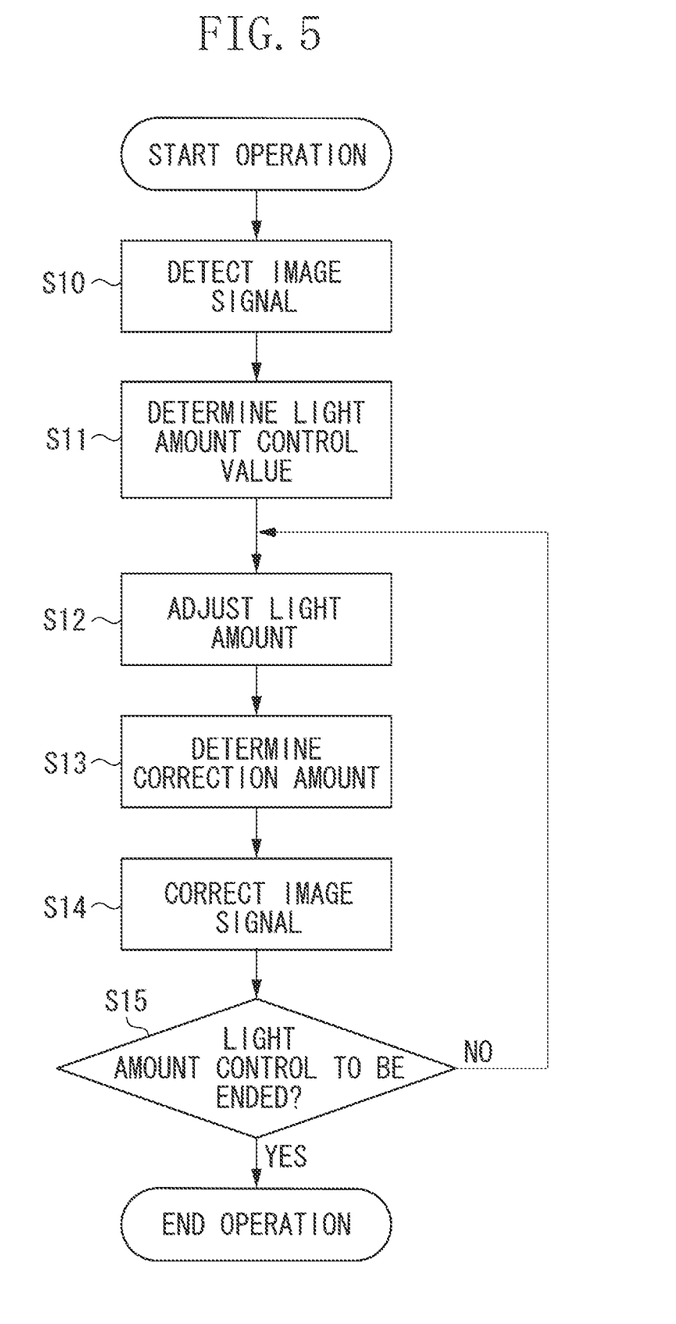
FIG. 5 is a flowchart of processing for operating a control unit.

The following describes operations of the control unit 103 according to the present exemplary embodiment with reference to the flowchart illustrated in FIG. 5. The control unit 103 performs the processing at predetermined time intervals according to a computer program (display apparatus control program).

As an example of an operation, processing of the flowchart is performed at each of a time t0 to a time t8. The following describes a case where an image 1 illustrated in FIG. 6A is input to the image signal input unit 101 during a period from the time t0 to a time t1, and an image 2 illustrated in FIG. 6B is input during a period from the time t1 to the time t8.

Figure 6A:
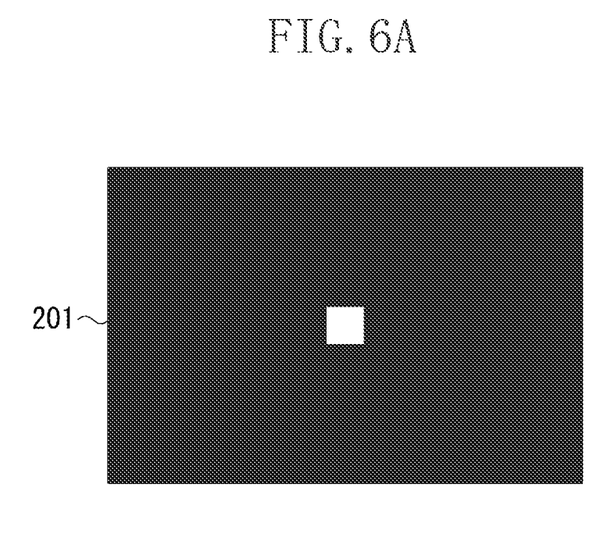
FIGS. 6A and 6B illustrate examples of image signals.
Figure 6B:
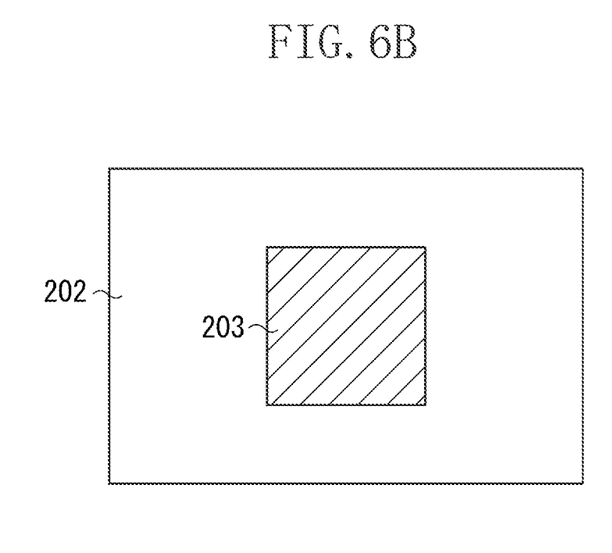

The image 1 illustrated in FIG. 6A and the image 2 illustrated in the FIG. 6B have a 3-color signal level including the red, green, and blue color components. Each component of the signal level is represented by an 8-bit value from 0 to 255. Referring to FIG. 6A, the image 1 includes a region 201 having a signal level (0, 0, 0) corresponding to the red, green, and blue color components, respectively, and includes at the central portion a region having a signal level larger than 0. The image 1 is a wholly dark image. Referring to FIG. 6B, the image 2 includes a region 202 having a signal level (255, 255, 255) and a region 203 having a signal level (255, 128, 128). The image 2 is a wholly bright image.

Figure 7:
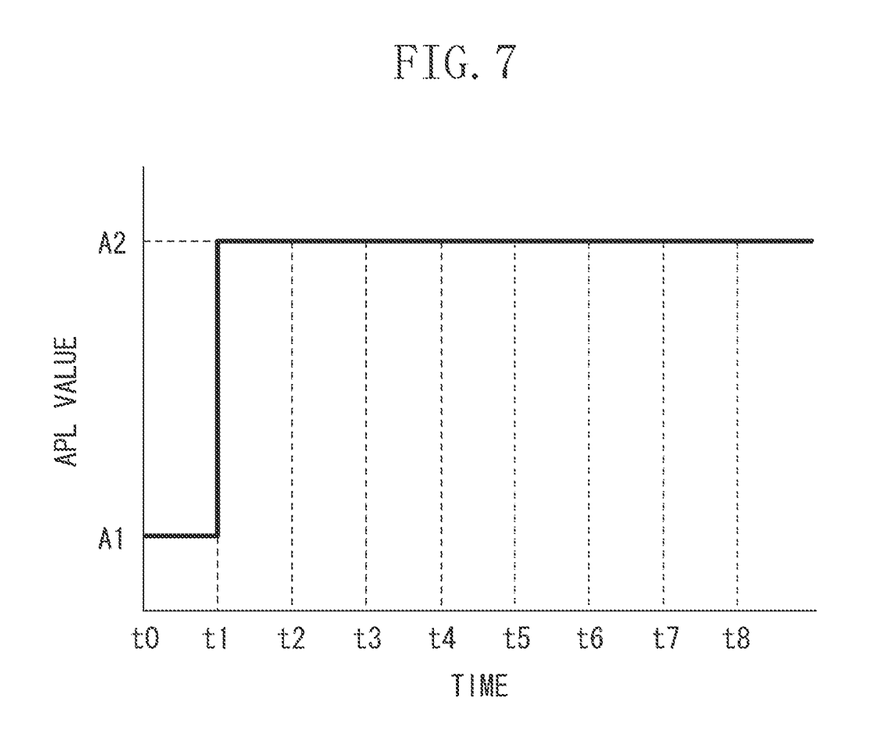
FIG. 7 schematically illustrates a time transition of the APL value.

In step S10, the control unit 103 acquires the APL value of the image signal input to the image signal input unit 101, derived by the image signal detection unit 102. FIG. 7 illustrates an example of a time transition of the APL value. The horizontal axis represents time and the vertical axis represents the APL value detected by the image signal detection unit 102. At the time t0, the wholly dark image 1 is input, and A1 is derived as the APL value. At a time t1 to the time t8, the wholly bright image 2 is input, and A2 larger than A1 is derived as the APL value in that time period.

Figure 8:
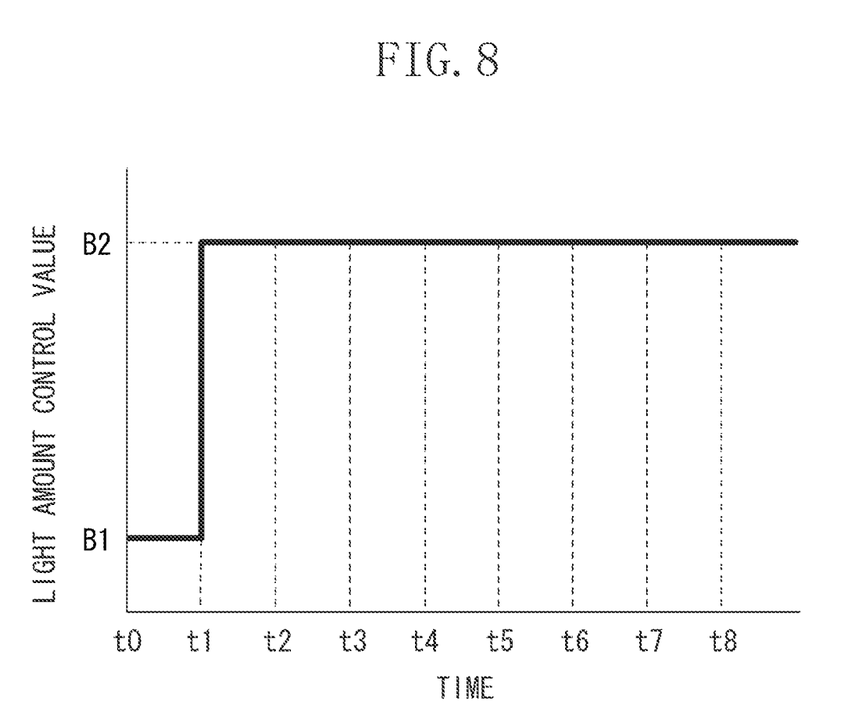
FIG. 8 schematically illustrates a time transition of the light amount control value.

In step S11, the control unit 103 determines the light amount control value based on the acquired APL value. FIG. 8 illustrates an example of a time transition of the light amount control value. The horizontal axis represents time and the vertical axis represents the light amount control value. At the time t0, the APL value is A1 which is smaller than A2, and the control unit 103 determines the light amount control value as B1, referring to FIG. 2. At the time t1 to t8, the APL value is A2 which is larger than A1, and the control unit 103 determines the light amount control value as B2 which is larger than B1, referring to FIG. 2. While, according to the present exemplary embodiment, the control unit 103 determines the light amount control value as a function of the APL value, the control unit 103 may prestore the relation between the APL value and the light amount control value as table data in a storage unit (not illustrated) and determine the light amount control value by using the APL value as a read address.

Figure 9:
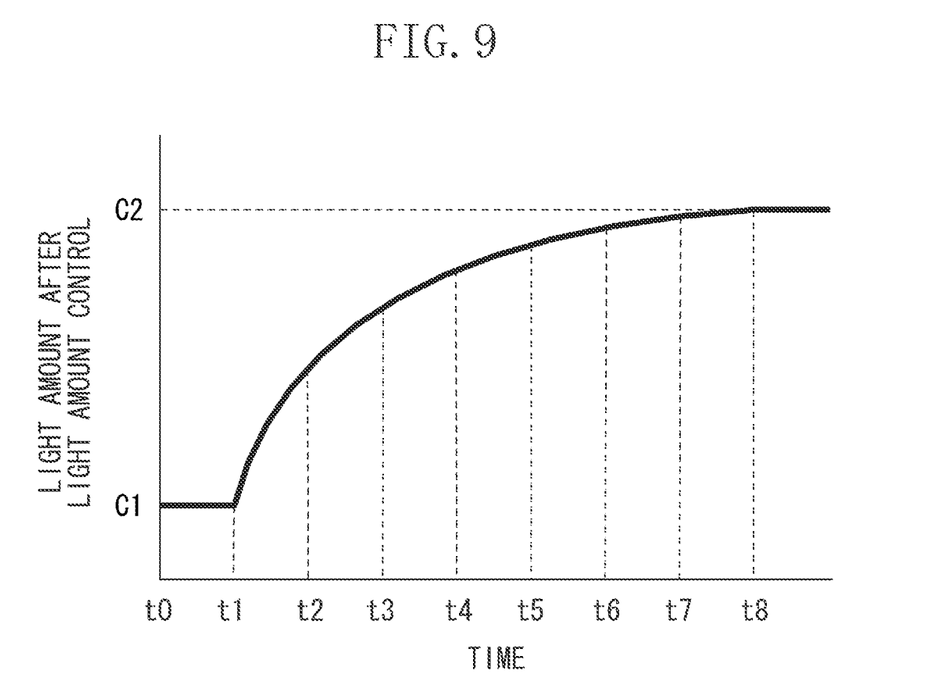
FIG. 9 schematically illustrates a time transition of the light amount after light amount control.

In step S12, the control unit 103 notifies the light amount control unit 105 of the determined light amount control value to adjust the light amount. FIG. 9 illustrates an example of a time transition of the light amount after the notification. The horizontal axis represents time and the vertical axis represents the light amount after the light amount control unit 105 performs light amount control. At the time t0, since the light amount control value takes the small value B1, the light amount is small after light amount control is performed as shown by a light amount C1 illustrated in FIG. 9. At the time t1, the light amount control value changes from B1 to B2. However, after the control unit 103 notifies the light amount control unit 105 of the light amount control value, it takes a predetermined time until the light amount controlled by the light amount control unit 105 reaches the light amount corresponding to the light amount control value. More specifically, it takes a duration from the time t1 to the time t8 until the light amount changes from the light amount C1 corresponding to the light amount control value B1 to a light amount C2 corresponding to light amount control value B2.

Figure 10:
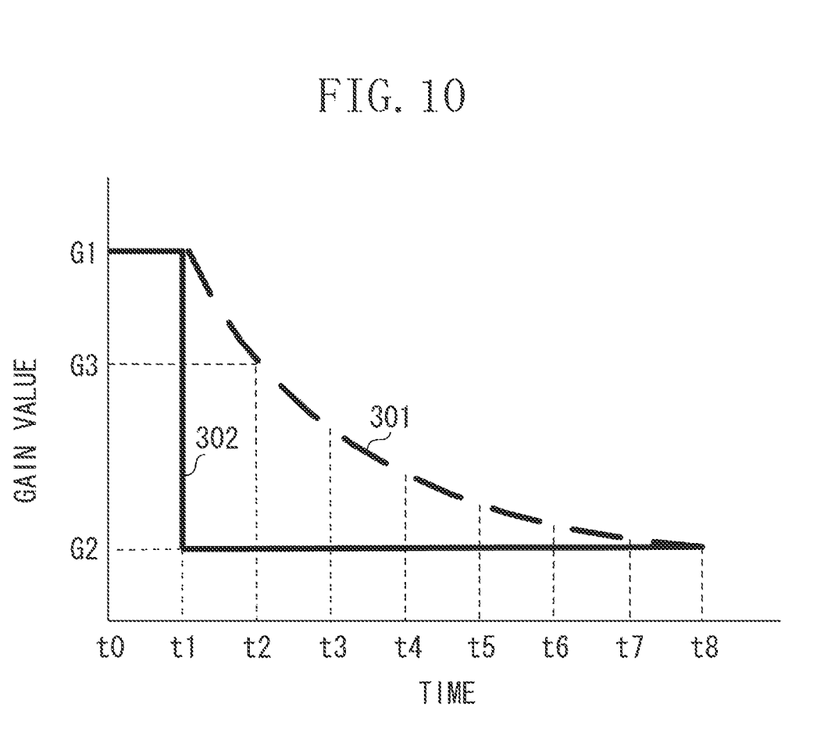
FIG. 10 schematically illustrates a time transition of the gain value.

In step S13, the control unit 103 determines the gain value based on the determined light amount control value. FIG. 10 illustrates an example of a time transition of the gain value. The horizontal axis represents time and the vertical axis represents the gain value. A dashed line 301 indicates a time transition of the gain value in a case where the image signal level is changed to a bright level to compensate the brightness change of the projection image due to the light amount change of the light amount control unit 105 illustrated FIG. 9. More specifically, the dashed line 301 indicates the time transition of the gain value in a case where control is performed to satisfy a relational expression $G=1/C$, where C denotes the light amount after light amount control is performed and G denotes the gain value. A solid line 302 indicates the time transition of the gain value in a case where the image signal level is changed based on the light amount control value regardless of the light amount change of the light amount control unit 105.

The light amount control unit 105 according to the present exemplary embodiment determines the gain value along the solid line 302.

Effects of this control will be described below. Referring to the dashed line 301 illustrated in FIG. 10, the gain value at the time t2 is G3. For example, if the gain value G3 is twice as high, the region 203 of the image 2 has a signal level (255, 128, 128). Therefore, when this signal level is multiplied by the gain value twice as high, a signal level becomes (255, 255, 255). In other words, the signal level is saturated, and overexposure occurs, which results in a color change.

On the other hand, referring to the solid line 302 illustrated in FIG. 10, the gain value at the time t2 is G2. For example, if the gain G2 is x1, the region 203 of the image 2 has a signal level (255, 128, 128). When this signal level is multiplied by the x1 gain value, a signal level becomes (255, 128, 128). More specifically, the gain value becomes the gain value based on the light amount control value more quickly than in the case of controlling the gain value to compensate the brightness change of the projection image due to the light amount change of the light amount control unit 105. This method makes it possible to alleviate the saturation of the signal level of a bright image.

In step S14, the image processing 106 corrects (controls) the image signal level based on the gain value (represented by the solid line 302 illustrated in FIG. 10) determined in step S13.

In step S15, the control unit 103 determines whether the light amount control is to be ended. The control unit 103 determines whether to end the light amount control based on whether the light amount controlled by the light amount control unit 105 reaches the light amount corresponding to the light amount control value. For example, if the relation between the state of the optical members and the light amount is prestored as table data in a storage unit (not illustrated), and a position detection sensor is provided on the optical members, the control unit 103 can detect the state (aperture diameter and open/close state) of the optical members, acquire the light amount based on the table data, and determine whether to end the light amount control. According to the present exemplary embodiment, at the time t0, since the light amount controlled by the light amount control unit 105 has already reached the light amount corresponding to the light amount control value in controlling the light amount of the image 1, the control unit 103 ends the light amount control. At the time t1, the control unit 103 performs processing of the flowchart again. During the duration from the time t1 to t8, the light amount control of the image 2 is in progress as illustrated in FIG. 9, and the processing returns to step S12. In step S12, the control unit 103 continues the light amount control. At the time t8, the light amount controlled by the light amount control unit 105 reaches the light amount corresponding to the light amount control value, and the control unit 103 ends the light amount control of the image 2.

According to the first exemplary embodiment, as described above, particularly when the image signal level changes from a dark scene to a bright scene, the image signal level changes more quickly than the light amount controlled by the light amount control unit 105 changes. This method makes it possible to alleviate the saturation of the signal level of a bright image, which improves the display quality according to the signal level of input image data.

Figure 11:
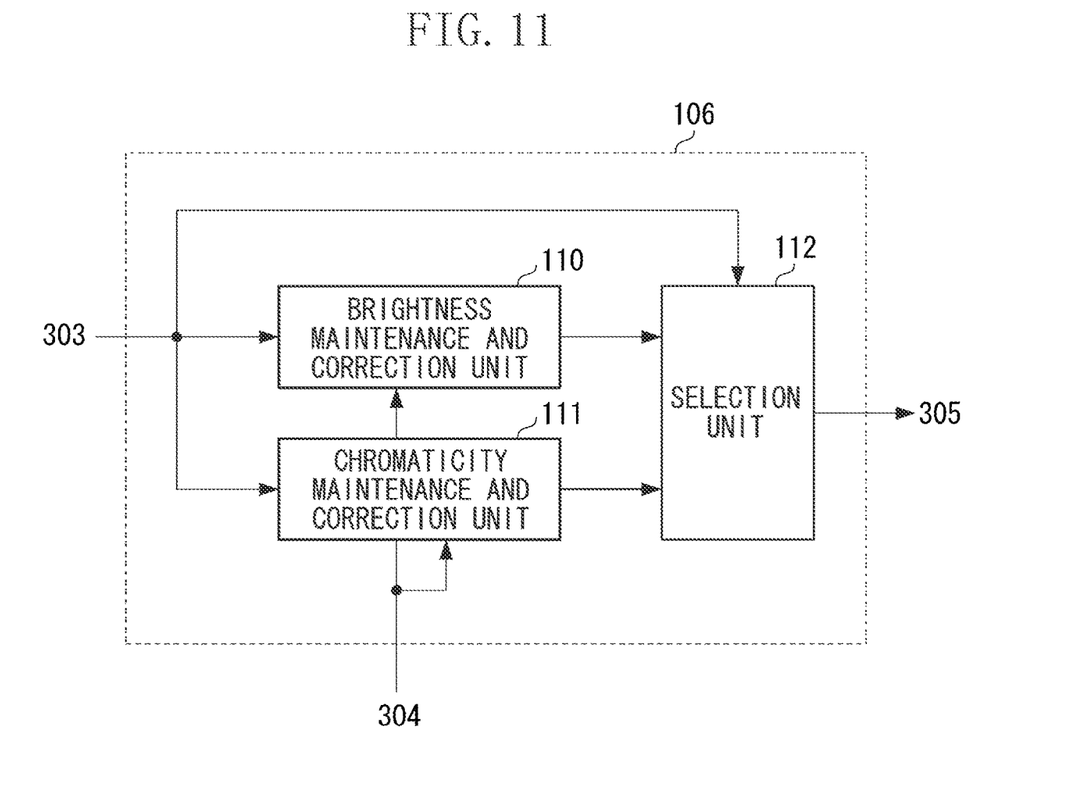
FIG. 11 is a block diagram illustrating a configuration of a part of a control unit according to a second exemplary embodiment.

A second exemplary embodiment of the present disclosure will be described in detail below with reference to the accompanying drawings. The present exemplary embodiment differs from the first exemplary embodiment in that a brightness maintenance and correction unit 110, a chromaticity maintenance and correction unit 111, and a selection unit 112 are added to the control unit 103. For components equivalent to those in the first exemplary embodiment, descriptions will be suitably omitted.

FIG. 11 illustrates a part of an internal configuration of the control unit 103 of the image processing apparatus illustrated in FIG. 1. The image processing unit 106 determines the correction amount when correcting the image signal.

Referring to FIG. 11, the image processing unit 106 inputs via a line 303 the APL value output by the image signal detection unit 102 and outputs via a line 305 the correction amount to the image processing unit 106.

The brightness maintenance and correction unit 110 determines the gain value to compensate the brightness reduction due to light amount decrease when the light amount is controlled based on the APL value. The brightness maintenance and correction unit 110 determines a gain value G21 according to the Formula 1, where C denotes the light amount after the light amount control is performed by the light amount control unit 105.

$$G21 = 1/C \qquad \text{(Formula 1)}$$

The chromaticity maintenance and correction unit 111 determines the gain value to compensate the brightness reduction due to light amount decrease when the light amount is controlled based on the APL value, within a range in which the chromaticity remains unchanged. For example, the chromaticity maintenance and correction unit 111 determines a gain value G22 according to the Formula 2, where C denotes the light amount after light amount control is performed, RLVL (0 to 255) denotes the signal level of the red color component, GLVL (0 to 255) denotes the signal level of the green color component, and BLVL (0 to 255) denotes the signal level of the blue color component.

$$G22 = \text{MIN}(1/C, 255/\text{MAX}(RLVL, GLVL, BLVL)) \qquad \text{(Formula 2)}$$

More specifically, the gain value G22 is the maximum gain value within a range in which the ratio (composition ratio) of RLVL, GLVL, and BLVL is maintained.

The selection unit 112 selects the gain value G21 determined by the brightness maintenance and correction unit 110 or the gain value G22 determined by the chromaticity maintenance and correction unit 111 based on the APL value. For example, when the APL value variation is small, the selection unit 112 selects the gain value G21 output by the brightness maintenance and correction unit 110. Thus, when the APL value variation is small, the control unit 103 corrects the image to compensate the brightness reduction in the light amount decrease. When the APL value greatly changes from a small value to a large value, i.e., when the target scene changes from a dark scene to a bright scene, the selection unit 112 selects the gain value G22 determined by the chromaticity maintenance and correction unit 111. When the target scene changes from a dark scene to a bright scene, the image signal level is corrected within a range in which the chromaticity remains unchanged, which reduces color change caused by the saturation of the signal level of the bright scene.

Operations of the control unit 103 according to the present exemplary embodiment will be described below with reference to the flowchart illustrated in FIG. 5. The control unit 103 performs this processing at predetermined time intervals according to a computer program (display apparatus control program). With respect to processing equivalent to the first exemplary embodiment, descriptions thereof will be suitably omitted.

In step S10, the control unit 103 resets FLG (described below) to 0. Then, the control unit 103 acquires the APL value of the image signal input to the image signal input unit 101, which is derived by the image signal detection unit 102. The control unit 103 calculates the difference from the APL value stored in a storage unit (not illustrated).

$$DAPL = \text{(Current APL)} - \text{(APL stored in storage unit)} \qquad \text{(Formula 3)}$$

Then, the control unit 103 determines whether the value of the calculated DAPL is equal to or larger than a predetermined positive threshold value. When the DAPL value is equal to or larger than the predetermined threshold value, the control unit 103 sets FLG to 1. On the other hand, when the DAPL value is less than the predetermined threshold value, the control unit 103 sets FLG to 0 and stores the FLG in a storage unit (not illustrated). In other words, the FLG is set to 1 when the input image signal changes from a dark scene to a bright scene, or set to 0 otherwise. The control unit 103 stores the acquired APL value in a storage unit (not illustrated).

In step S13, the control unit 103 determines the gain value based on the FLG stored in step S10 and the determined light amount control value. When FLG=1, the control unit 103 determines the gain value G22 determined by the chromaticity maintenance and correction unit 111 as the gain value. When FLG=0, the control unit 103 determines the gain value 21 determined by the brightness maintenance and correction unit 110 as the gain value.

According to the second exemplary embodiment, as described above, it is possible to change image signal correction processing in response to the change of the image signal level. Therefore, when the image signal level changes from a dark scene to a bright scene, the image signal level changes more quickly than the light amount controlled by the light amount control unit 105 changes. This method makes it possible to alleviate the saturation of the signal level of a bright image, which improves the display quality in controlling the light amount according to the signal level of input image data.

As described above, the present disclosure provides improvements in image processing technology by improving display quality in controlling the light amount according to the signal level of image data.

While the present disclosure has specifically been described based on the above-described preferred exemplary embodiments, the present disclosure is not limited thereto but can be modified in diverse ways within the ambit of the appended claims.

While, in the above-described exemplary embodiment, the APL value of the current image signal is used, past APL values may be stored in a storage unit (not illustrated) and the average value of these values may be used as the APL value.

In the determination of the gain value according to the second exemplary embodiment, the gain value may be calculated based on only one of the Formula 1 and 2 depending on the result of FLG.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-144398, filed Jul. 26, 2017, which is hereby incorporated by reference herein in its entirety.

What is claimed is:

1. A display apparatus for displaying an image based on an input image signal, the display apparatus comprising:
   a light source;
   an image processor configured to generate an output image signal based on the input image signal;
   a signal detector configured to derive image information based on the input image signal;
   a storage unit configured to store the image information derived by the signal detector at predetermined time intervals; and
   a controller configured to control an amount of light emitted from the light source based on the image information, and the image processor based on the image information stored on the storage unit and the image information derived later than the image information stored on the storage unit,
   wherein the controller performs control such that, when a signal level of the input image signal changes from a signal level lower than a predetermined signal level to the predetermined signal level or higher, a signal level of the output image signal generated by the image processor becomes a signal level corresponding to the image information more quickly than the light amount controlled by the controller reaches a light amount corresponding to the image information.

2. The display apparatus according to claim 1, wherein the controller performs control such that, when the signal level of the input image signal changes from the predetermined signal level or higher to a signal level lower than the predetermined signal level, the signal level of the output image signal is controlled by the image processor to compensate the change of the controlled by the controller.

3. The display apparatus according to claim 2, wherein, when the signal level of the input image signal changes from a signal level lower than the predetermined signal level to the predetermined signal level or higher, the controller further controls the signal level of the output image signal using the image processor to maintain a composition ratio of color components included in the input image signal.

4. The display apparatus according to claim 1, wherein the image information is an average value of the signal level of the input image signal.

5. The display apparatus according to claim 1, wherein the image information is a histogram representing a distribution of the signal level of the input image signal.

6. The display apparatus according to claim 1, further comprising a light amount controller controlled by the controller, wherein the light amount controller includes a light-shielding member on an optical path of an optical system for projecting the image from the light source.

7. The display apparatus according to claim 1,
wherein the light source is a solid light source, and
wherein the controller controls a brightness of the solid light source to control a light amount.

8. A method for controlling display of an image based on an input image signal, the method comprising:
controlling an amount of light emitted from a light source;
generating an output image signal based on the input image signal;
deriving image information based on the input image signal at predetermined time intervals; and
storing the image information,
wherein, based on the image information being derived and the image information being stored, it is determined whether a signal level of the input image signal changed from a signal level lower than a predetermined signal level to the predetermined signal level or higher, and in a case where it is determined that a signal level of the input image signal changed from a signal level lower than a predetermined signal level to the predetermined signal level or higher, a signal level of the generated output image signal becomes a signal level corresponding to the image information more quickly than the controlled light amount reaches a light amount corresponding to the image information.

9. A non-transitory storage medium storing a program for causing a computer to execute a method for controlling display of an image based on an input image signal, the method comprising:
controlling an amount of light emitted from a light source;
generating an output image signal based on the input image signal;
deriving image information based on the input image signal at predetermined time intervals; and
storing the image information,
wherein, based on the image information being derived and the image information being stored, it is determined whether a signal level of the input image signal changed from a signal level lower than a predetermined signal level to the predetermined signal level or higher, and in a case where it is determined that a signal level of the input image signal changed from a signal level lower than a predetermined signal level to the predetermined signal level or higher, a signal level of the generated output image signal becomes a signal level corresponding to the image information more quickly than the controlled light amount reaches a light amount corresponding to the image information.

* * * * *